United States Patent
Abbiati (10) Patent No.: US 10,799,059 B2
(45) Date of Patent: Oct. 13, 2020

(54) METHOD FOR DISPENSING DOSES OF COFFEE GROUNDS

(71) Applicant: Gruppo Cimbali S.p.A., Binasco (IT)

(72) Inventor: Giacomo Abbiati, Binasco (IT)

(73) Assignee: Gruppo Cimbali S.p.A. (IT)

( * ) Notice: Subject to any disclaimer, the term of this patent is extended or adjusted under 35 U.S.C. 154(b) by 304 days.

(21) Appl. No.: 15/828,981

(22) Filed: Dec. 1, 2017

(65) Prior Publication Data

US 2018/0153332 A1 Jun. 7, 2018

(30) Foreign Application Priority Data

Dec. 2, 2016 (IT) .................. 102016000122725

(51) Int. Cl.
| | | |
|---|---|---|
| *A47J 31/42* | (2006.01) | |
| *A47J 42/40* | (2006.01) | |
| *A47J 31/06* | (2006.01) | |
| *A47J 42/42* | (2006.01) | |
| *A47J 42/44* | (2006.01) | |
| *A47J 42/50* | (2006.01) | |
| *A47J 43/07* | (2006.01) | |
| *G01G 23/01* | (2006.01) | |

(52) U.S. Cl.
CPC ........... *A47J 31/42* (2013.01); *A47J 31/0663* (2013.01); *A47J 42/40* (2013.01); *A47J 42/42* (2013.01); *A47J 42/44* (2013.01); *A47J 42/50* (2013.01); *A47J 2043/0733* (2013.01); *G01G 23/01* (2013.01)

(58) Field of Classification Search
CPC ........ A47J 31/42; A47J 42/40; A47J 31/0663; A47J 42/42; A47J 42/44; A47J 42/50; A47J 2043/0733; A47J 31/404; A47J 31/52; G01G 23/01
See application file for complete search history.

(56) References Cited

U.S. PATENT DOCUMENTS

| | | | |
|---|---|---|---|
| 5,462,236 A | 10/1995 | Knepler | |
| 2012/0024160 A1* | 2/2012 | Van Os | A47J 42/50 99/280 |
| 2016/0143481 A1 | 5/2016 | Merelli | |

(Continued)

FOREIGN PATENT DOCUMENTS

| | | |
|---|---|---|
| CN | 103932596 A | 7/2014 |
| EP | 0139964 A1 | 5/1985 |
| EP | 2314188 A1 | 4/2011 |

(Continued)

*Primary Examiner* — Rick K Chang
(74) *Attorney, Agent, or Firm* — Alan G. Towner; Leech Tishman Fuscaldo & Lampl (57) ABSTRACT

A method of controlling dispensing of doses of coffee grounds, the machine comprising a grinding device which is configured to grind coffee beans, a conduit, having an inlet in communication with the grinding device for receiving coffee grounds, and an outlet, a closure member which is adapted to be removed between an open position for the coffee grounds to be discharged from the conduit through the outlet, and a closed position for closing the outlet, and a coffee grounds weight sensor, which is configured to generate signals representative of the weight of coffee grounds built-up in the dispensing conduit when the closure member is in the closed position.

9 Claims, 7 Drawing Sheets

(56) References Cited

U.S. PATENT DOCUMENTS

2016/0235249 A1     8/2016  Teahan
2018/0271322 A1*    9/2018  Thai ..................... A47J 31/002

FOREIGN PATENT DOCUMENTS

| EP | 3097831 A1 | 11/2016 |
|----|------------|---------|
| ES | 1089030 U | 9/2013 |
| IT | 1187064 B | 12/1987 |
| WO | 2011070502 A1 | 6/2011 |
| WO | 2013015801 A1 | 1/2013 |
| WO | 2015006244 A1 | 1/2015 |

* cited by examiner

METHOD FOR DISPENSING DOSES OF COFFEE GROUNDS

FIELD OF THE INVENTION

The present invention finds application in the field of grinding of coffee beans as is needed for preparation of a coffee beverage, e.g. espresso. Particularly, the invention relates to a method and an apparatus for controlled dispensing of doses of coffee grounds.

BACKGROUND ART

When preparing coffee beverages, such as espresso, coffee beans are first ground in a coffee grinder. Then the coffee grounds are brewed using high-pressure hot water in a coffee machine. The coffee grounds ejected by the coffee grinder is carried to the coffee machine into a portafilter, in which it is held even during preparation and dispensing of the beverage.

In order to obtain a coffee of the desired type, optimal adjustment of process parameters is generally desired, such as the degree of grinding of coffee beans, pressing of the coffee grounds amount of coffee grounds in use, proper ground coffee-to-water ratio, and water temperature and pressure.

In a conventional grinding-dosing machine, coffee powder is filled in a collecting container and the barista allows coffee powder to be ejected from the container into the portafilter, typically by actuating a lever.

IT1187064, for example, discloses an automatic coffee machine for dispensing coffee, which provides a consistent volume of brewed beverage and allows dispensing to be measured with time, such that the user is promptly given an indication of the quality of the dispensed coffee.

On the other hand, ES1089030 discloses a coffee grinder that incorporates a graduated transparent tube, allowing the amount of coffee that is being ground to prepare a single coffee dose. Therefore, the barista will receive a visual check of the amount of coffee grounds, and will thus decide when he/she will manually act to turn off the coffee grinder and stop grinding the coffee beans. The coffee dose is checked based on the volume of coffee that has been ground.

Professional grinding-dosing machines, e.g. for preparing doses of coffee grounds for espresso beverages from a coffee machine in a bar or restaurant, are often configured to operate "on demand", with coffee beans being directly ground into the portafilter upon request.

In the coffee grinder as disclosed in EP2314188 the coffee dose to be fed to the portafilter is adjusted based on preset grinding times. The coffee grinder may recognize the portafilter in use and autonomously decide the dose of coffee grounds to be dispensed. Each portafilter is associated with a coffee dispenser, which dispenses coffee according to a predetermined recipe and, as the coffee grinder recognizes the portafilter, it will provide a provide a predetermined amount of coffee grounds, e.g. a single or a double dose, associated with the recipe.

WO 2015/006244 discloses a coffee grinder equipped with a load cell that supports a fork for the barista to lay the portafilter thereon while the latter is being filled with coffee grounds. This will deform the load cell, and as its deformation is measured, the grinder will be able to provide a measurement of the mass of the portafilter containing the coffee grounds to the barista. Therefore, the mass of the coffee grounds is obtained by subtracting the mass of the empty portafilter from the measured value. The coffee grinder as disclosed in this document also provides arrangements to preserve the load cell from impacts that might damage it, particularly when the barista lays the portafilter on the fork. This is because the load cell should not be exposed to stresses that are too higher than those expected for weighing.

US 2016/0143481 addresses a coffee grinding machine comprising a dispensing conduit connected to a grinder unit for dispensing coffee into a filter supported by a portafilter supported by a platform, wherein a load cell is connected to the support platform for weighing the amount of coffee contained in the filter. The load cell is electrically connected to a control unit that receives measurement signals indicative of the weight of coffee and is configured to stop the grinder unit when the weight of the coffee attains a predetermined value.

SUMMARY OF THE INVENTION

The Applicant found that measurement of the mass of the coffee grounds provides, in certain cases of interest, more accurate dosing as compared with the control of the grinding time or the volume of coffee grounds.

The arrangements as disclosed in WO 2015/006244 and US 2016/0143481 provide the possibility of measuring the mass of the coffee grounds. The Applicant found that, since the devices as disclosed therein effect measurements with the weight of the portafilter supported by the load cell, the mass of the empty portafilter has to be precisely known. One coffee grinder is generally used with various portafilters, which usually have different masses. It shall be noted that a portafilter may weigh a few hundred grams, and a dose of coffee grounds generally has a much lower weight, e.g. a few grams. Therefore, even slight mass differences between two portafilters, possibly of the same type, may be significant as compared with the weight of the coffee to be dosed.

In the "on demand" operating mode, the machine can dispense doses of coffee grounds based on the grinding time. Dispensing is stopped upon expiry of the time that has been set when programming the machine. These machines are often equipped with a user interface which is used by a user to input the target dose, e.g. a single or double dose, and optionally the degree of grinding. Typically, the coffee grounds is ejected from a grinder unit into a filter within a portafilter via a dispensing conduit.

Grinding time control may lead to dispensing of inaccurate doses of coffee grounds for various reasons. This is because coffee beans may form agglomerates due to the effect of grease on the grains; furthermore, the coffee grinder is prone to wear, which leads to a time-dependent degradation of its operation parameters. Similar problems may cause changes in the degree of grinding or irregular sliding of the outflowing coffee grounds from the coffee grinder, leading to dosing errors.

Any changes in coffee mixtures or operating parameters of the machine may affect the mass throughput, e.g. grams/second, of the coffee powder that flows down through the dispensing conduit.

A change in the mass throughput may lead, under identical grinding time conditions, to dispensing of a dose of coffee that deviates from the target value. A relatively slight deviation may affect the final result in the cup. For example, an underbrewed or an overbrewed beverage may be obtained, with undesired organoleptic results.

If the machine has been set to dispense doses in a time-dependent manner, dispensing of a dose other than the desired dose may be perceived only upon preparation of beverages whose taste or quality are not as desired. Generally, the prepared beverage may be also visually different, and may fall from the machine with a stream other than a "mouse tail" stream.

On the other hand, adjustment and calibration of the machine by a user are often time-consuming operations, leading to downtime of the grinding-dosing machine.

The Applicant realized that a procedure for automatic control of the dose being dispensed may afford an accurate check that the dose being dispensed matches the nominal dose for a given coffee beverage.

The Applicant also realized that, by automatically weighing the coffee grounds when the coffee has not being dropped into the portafilter yet, the "on demand" operating mode, only based on the grinding time, may be replaced by a mode affording control of the dose that is being actually dispensed without requiring coffee dose dispensing to be stopped.

The present disclosure provides a method of controlling dispensing of coffee grounds from a grinding-dosing machine, the machine comprising a grinding device which is configured to grind coffee beans, a conduit, having an inlet in communication with the grinding device for receiving coffee grounds, and an outlet, a closure member which is adapted to be removed between an open position for the coffee grounds to be discharged from the conduit through the outlet, and a closed position for closing the outlet, and a coffee grounds weight sensor, which is configured to generate measurement signals representative of the weight of coffee grounds built-up in the dispensing conduit when the closure member is in the closed position, the method comprising: a) storing a nominal weight value of coffee grounds; b) storing a nominal grinding time value associated with the nominal weight value; c) placing the closure member in the closed position; d) operating the grinding device for discharging coffee grounds through the conduit onto the closure member for a time equal to the nominal grinding time value, in a first grinding operation; e) Receiving, at the end of the first grinding operation, a measurement signal representative of an actual weight value of coffee grounds built-up on the closure member; f) comparing the actual weight value with the stored nominal weight value and, based on the result of the comparison, if the measured actual weight value defers from the nominal weight value to an extent exceeding a predetermined threshold value, calculating a mass throughput based on the actual weight value and the nominal grinding time value; g) based on the calculated mass throughput value, calculating an actual grinding time value to obtain the nominal value of the coffee grounds dose, and h) storing the actual grinding time value as a new nominal grinding time value.

Preferably, the predetermined threshold value for deviation between the nominal weight value and the actual weight value is 10%, more preferably 7%.

The flow throughput is calculated as a ratio of the actual weight value to the nominal grinding time value as previously stored.

Preferably, before the step d), the method comprises receiving input data requesting coffee grounds dispensing, associated with the nominal weight value of coffee grounds, and the step d) is carried out in response to the reception of said input data.

In one embodiment, the machine comprises a portafilter-retaining support and a presence sensor, which is configured to generate an electric signal for notifying the presence of the portafilter when the portafilter has been placed in the retaining support, wherein the method comprises, before the step d), placing a portafilter on the retaining support, detecting the presence of the portafilter using the presence sensor, wherein receiving input data requesting coffee grounds dispensing associated with the nominal weight value comprises receiving a presence detection electric signal, wherein the grinding operation according to step d) is carried out in response to reception of the presence detection signal.

A grinding-dosing machine is also disclosed, according to claim 10.

A method of controlling dispensing of coffee grounds from a grinding-dosing machine, the machine comprising a grinding device which is configured to grind coffee beans, a dispensing conduit, having an inlet in communication with the grinding device for receiving coffee grounds, and an outlet, a closure member which is adapted to be removed between an open position for the coffee grounds to be discharged from the conduit through the outlet, and a closed position for closing the outlet, and a coffee grounds weight sensor, which is configured to generate signals representative of the weight of coffee grounds built-up in the dispensing conduit when the closure member is in the closed position, the method comprising: (i) storing a nominal weight value of the coffee grounds and a nominal grinding time value, which are associated with a type of coffee-based beverage, (ii) placing the closure member in the closed position; (iii) operating the grinding device for discharging coffee grounds through the dispensing conduit onto the closure member for a time equal to the nominal grinding time value; (iv) receiving a measurement signal representative of an actual weight value of coffee grounds built-up on the closure member at the end of the grinding operation; (v) recording said measured actual weight value; (vi) moving the closure member to the open position for the coffee grounds to be discharged; (vii) repeating the steps (ii) to (vi) a plurality (N−1) of times, with N≥2, to record a plurality of N actual weight values at the end of N respective grinding operations; (viii) calculating a respective plurality of mass throughput values based on the plurality N of actual weight values and the nominal grinding time value; (ix) calculating an average mass throughput value from the plurality N of mass throughput values and an average weight value from the plurality N of measured actual weight values; (x) comparing the average weight value with the stored nominal weight value and, if the average weight value differs from the nominal weight value to an extent exceeding a predetermined threshold value, calculating an average grinding time value, defined as a ratio of the nominal weight value to the calculated average mass throughput value, and (xi) storing said average grinding time value as a new nominal grinding time value.

Preferably, the N value is of from 2 to 10 μm.

Preferably, the predetermined threshold value for deviation between the nominal weight value and the actual weight value is 10%, more preferably 7%.

A grinding-dosing machine is also disclosed, according to claim 13.

According to the preferred embodiments of the invention, in the coffee dose control mode, the coffee grounds are weighed in a dispensing conduit that is held closed, where it builds up during grinding, and is then discharged into the portafilter as the conduit is opened. During or at the end of grinding, the mass of coffee that has built up is weighed by means of a weight sensor.

Preferably, the weight sensor is a load cell, more preferably a bending beam load cell.

Preferably, the dispensing conduit and, as a result, the coffee grounds building up therein upon the closure member, is supported on the load cell in hanging relation. Particularly, the load cell comprises a flexible free end portion, which is mechanically connected to the dispensing conduit and to the closure member. This will afford accurate measurement and dosing of the mass of coffee grounds. Advantageously, the unladen mass as measured by the load cell is constant, which allows a single measurement to be taken during calibration of the load cell. Therefore, the load cell may be set to indicate a zero mass in a no-load measurement condition. Here, the mass that is being measured and indicated when coffee grounds are present directly corresponds to the mass of the coffee grounds, and there is no need to check the unladen mass at each weighing operation, i.e. before dispensing the coffee grounds, e.g. the mass of the portafilter.

Preferably, the closure member of the dispensing conduit is placed at the outlet of the dispensing conduit.

Preferably, the measurement signal representative of the weight of the coffee grounds built up in the dispensing conduit is an output electric signal of the weight sensor.

Preferably, the grinding-dosing machine comprises an electronic control unit, preferably a central processing unit (CPU), and the weight sensor is connected to the electronic control unit and is configured to generate a measurement signal representative of the measured weight of the coffee grounds. For example, if the weight sensor is a bending beam load cell, the measurement signal representative of the weight of coffee grounds is a voltage signal proportional to the deflection of the free end portion, of the cell.

In certain embodiments, if the weight sensor is a load cell, the grinding-dosing machine comprises a main body which comprises the dispensing conduit, the closure member and a load transfer structure attached to the free end portion of the load cell in such a manner as to be supported in hanging relation by the load cell, with the dispensing conduit and the closure member being attached to the load transfer structure in such a manner as to be supported by the cell through the load transfer structure.

Preferably, the grinding-dosing comprises a drive system for driving the closure member, the system comprising a motor driven by the electronic control unit and connected to the closure member. The control unit is configured to control the movement of the closure member from the closed position to the open position and vice versa.

Preferably, the grinding-dosing machine of the present disclosure further comprises a retaining support, which is configured to support and/or mechanically connect a portafilter. The outlet of the dispensing conduit faces the retaining support, for the coffee grounds to be discharged into the portafilter when the closure member is in the open position The outlet of the conduit is preferably placed above the retaining support for the portafilter.

The present disclosure relates to a method of dispensing a dose of coffee grounds from a grinding-dosing machine, the machine comprising a grinding device for grinding coffee beans, a dispensing conduit, having an inlet in communication with the grinding device for receiving coffee grounds, and an outlet, a closure member which is adapted to be removed between an open position for the coffee grounds to be discharged from the conduit through the outlet, and a closed position for closing the outlet, the method comprising: storing a buffer weight value and a first grinding time value associated with the buffer weight value; placing the closure member in the closed position; carrying out a first grinding operation, by operating the grinding device for a time equal to the first grinding time, for discharging coffee grounds through the dispensing conduit so that the amount of coffee grounds that build up on the closure member corresponds to the buffer weight value; receiving input data requesting coffee grounds dispensing, associated with a nominal weight value of coffee grounds; comparing the received nominal weight value input with the buffer weight value; based on the comparison result, if the nominal weight value corresponds to the buffer weight value, placing the closure member in the open position to discharge the coffee grounds built up at the end of the first grinding operation through the outlet of the dispensing conduit; based on the comparison result, if the nominal weight value is greater than the buffer weight value, carrying out the following steps: with the closure member maintained in the closed position, carrying out a second grinding operation by operating the grinding device to discharge coffee grounds through the conduit onto the closure member; stopping the grinding device when the built-up coffee is equal to the nominal weight value, or at the end of a grinding time associated with the nominal weight value, and placing the closure member in the open position to discharge the coffee grounds built up at the end of the first and second grinding operations through the outlet of the conduit.

Preferably, the buffer weight value corresponds to a single dose of coffee grounds. In certain embodiments, if the nominal weight value is greater than the buffer weight value corresponds to a dose of coffee grounds which is a multiple of the single dose.

In one embodiment, receiving input data requesting coffee grounds dispensing, associated with a nominal weight value of coffee grounds, comprises selecting a type of coffee beverage associated with said nominal weight value.

In one embodiment, the portafilter comprises an identifier and the grinding-dosing machine comprises an identification sensor, which is configured to read said identifier, when the portafilter is placed on the retaining support of the portafilter, and to generate a signal representative of the identifier. In this embodiment, receiving input data requesting coffee grounds dispensing associated with a nominal weight value of coffee grounds comprises receiving the signal representative of the identifier of the portafilter and associating the received signal with a nominal value of coffee grounds, which has been stored in the machine.

BRIEF DESCRIPTION OF THE FIGURES

Further features and advantages of the dosing device of this invention, will be apparent from the following description of one preferred embodiment thereof, which is given by way of illustration and without limitation with reference to the accompanying figures, in which.

DETAILED DESCRIPTION

Figure 1:
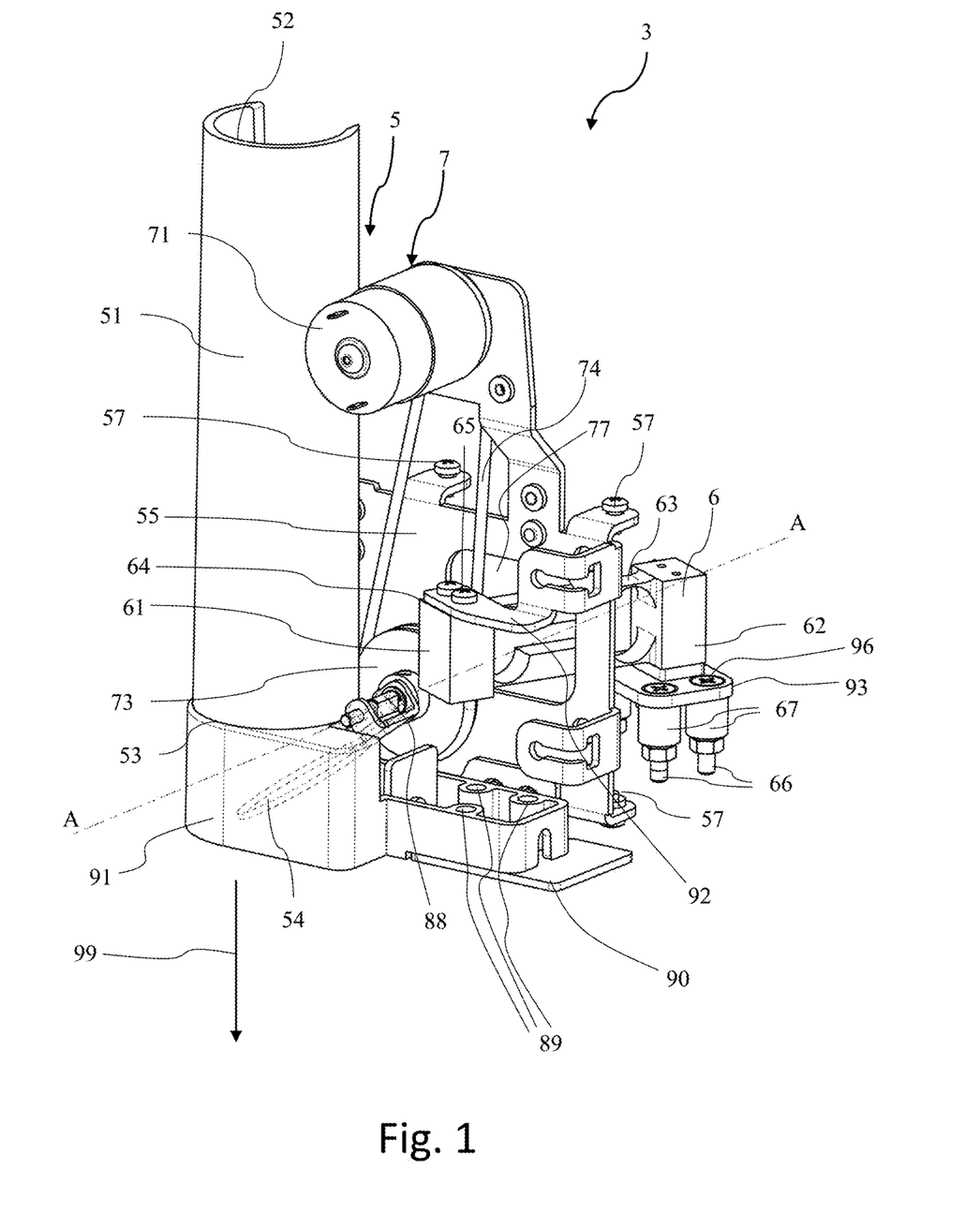
FIG. 1 shows a perspective view of a dosing device that may be included in a grinding-dosing machine, according to one embodiment of the present invention.

FIG. 1 shows a perspective view of a dosing device 3 that may be included in a grinding-dosing machine (not shown in FIGS. 1 to 5), according to one embodiment of the present invention. The dosing device 3 comprises a main body 5. The main body 5 comprises a dispensing conduit 51 having one inlet 52 and one outlet 53. The inlet 52 is configured to receive coffee grounds, e.g. from a coffee grinding device. The outlet 53 of the conduit 51 is configured to allow coffee grounds to be discharged from the conduit 51. The dispensing conduit 51 preferably extends in the vertical direction between the inlet 52 and the outlet 53. The coffee grounds received through the inlet 52 fall by gravity along the conduit 51 out of the outlet 53.

In certain embodiments, the dosing device 3 is configured to discharge predefined doses of coffee grounds. The dosed coffee grounds discharged from the dosing device 3 may be collected in a portafilter, typically supported by a retaining support (not shown in FIG. 1), such as a fork.

The main body 5 of the dosing device 3 comprises a closure member 54 which is preferably placed at the outlet 53 of the conduit 51. The closure member 54 is able to move between a closed position and an open position. In the embodiment as shown in the figures, the closure member 54 is a plate, e.g. a steel plate.

In the closed position, the closure member 54 prevents coffee grounds from being discharged out of the outlet 53 and allows coffee grounds to build up in the dispensing conduit 51. Preferably, in the closed position, the closure member closes the outlet 53 and supports the coffee grounds built up in the conduit 51. Conversely, in the open position, the closure member leaves the outlet 53 open, allowing coffee grounds to be discharged from the conduit 51 through the outlet, in the direction of the arrow 99.

In the examples as shown in FIGS. 1-4, the plate 54 is mounted to a pin 88 which acts as a fulcrum for pivoting about an axis of rotation AA and switching between the closed position and the open position is performed by rotating the plate from a horizontal position in which it closes the outlet of the conduit and a vertical position (substantially along the main direction of extension of the conduit, i.e. the direction 99) in which it leaves the outlet 53 open. It should be appreciated that, although preferred, the open position must not necessarily be in a plane substantially perpendicular to the plane in which the plate is in the closed position.

The dosing device 3 comprises a weight sensor 6 configured to generate electric measurement signals representative of the weight of the coffee built up in the dispensing conduit. Preferably, the weight sensor is a load cell 6, which is configured to measure the weight of the coffee grounds built up in the dispensing conduit 51 when the closure member 54 is in the closed position. Particularly, the load cell 6 comprises a free first end portion 61 and a second end portion 62 opposite thereto.

Preferably, the load cell is a bending beam load cell or a shear beam load cell. The load cell 6 generally comprises at least one flexible portion 63 situated between the first end portion 61 and the second end portion 62, and configured to deform under the weight applied to the first end portion 61. Furthermore, the load cell 6 may comprise one or more strain gages (not shown) applied to the flexible portion 63 and configured to generate a voltage signal proportional to the deformation of the flexible portion 62. Strain gages may be, for example, deformable resistors connected in a Wheatstone-bridge configuration, according to known techniques.

The load cell is connected to an electronic control unit (not shown in FIGS. 1-6), preferably a central processing unit (CPU), which is configured to receive the measurement signals representative of the load applied to the cell generated by the weight sensor. For example, the load cell is electronically connected to the electronic control unit for receiving voltage signals proportional to the deformation of the load cell and possibly for transmitting control signals to the sensor.

The first end portion 61 is flexible and is connected to the main body 5 of the dosing device 3 in such a manner as to support the main body 5 in hanging relation. In other words, the main body 5 hangs from the first end portion 61 of the load cell 6. Thus, the weight of the main body 5 and of the coffee built up in the main conduit 51 rests completely on the load cell 6, thereby causing the deformation of the flexible portion 62 and thus allowing the measurement of such weight, e.g. by means of the strain gages.

The load cell 6 is preferably configured to measure the weight of the coffee grounds built up in the conduit 51 of the main body 5 by difference between a gross weight of the main body 5, as measured when there are coffee grounds in the conduit 51 of the main body 5, and a tare weight constituted by the main body 5 itself with no coffee grounds in the conduit. The tare, that may be measured when the dispensing conduit 51 of the main body is empty, may be thus represented by a constant numerical value. The load cell 6 may be configured to indicate a zero weight when no coffee grounds are present in the conduit 51. Thus, the measurement signals transmitted by the load cell to the CPU are representative of the weight of the coffee built up in the conduit.

It will be appreciated that the load cell may operate in a relatively narrow range of values and provide adequately precise measurements. The load cell initially supports a main body that comprises the dispensing conduit and the mass of the coffee grounds is simply later added to such mass. Therefore, the mass increase recorded by the cell during measurement is only equal to the quantity to be measured, i.e. the mass of the coffee grounds. As a result, from an equilibrium position assumed by the load cell before grinding, the load cell is subjected to a small deformation when the coffee grounds are present.

As further discussed hereinafter, the second end portion 62 of the load cell 6 during use is fixed, particularly by means of a stable connection with a structure external to the main body, referred to hereinafter as support structure, e.g. a non-hanging panel or frame, such as a frame of a grinding-dosing machine that comprises the dosing device of the present disclosure.

In a preferred embodiment, the main body 5 comprises a load transfer structure 55. In the embodiment as shown in the figures, the load transfer structure 55 is shaped as a suitably shaped plate. Preferably, the load transfer structure 55 has a vertically-oriented main plane of extension (i.e., parallel to the main direction of extension of the conduit 51) and comprises at least one connecting portion 92 projecting out of the main plane of extension for attaching the structure 55 to the load cell 6, particularly the first free end portion, 61 of the cell 6. More generally, the load transfer structure 55 is attached to the first end portion, 61 of the cell 6, as discussed in greater detail below.

In the embodiment as shown in the figures, the load transfer structure 55 comprises an opening 77 which is configured to receive the load cell 6 in a transverse position across the opening. The load cell 6 is arranged to project out of the main plane of extension of the load transfer structure 55, and particularly both end portions of the load cell are arranged to project out of the main plane of extension of the load transfer structure.

The dispensing conduit 51 and the closure member 54 are engaged on the load transfer structure 55, and are particularly attached to it. For example, the conduit 51 is attached to the load transfer structure 55 through first fastener elements.

In the exemplary implementation of the figures, the main body 5 comprises an outlet connection element 91 disposed at the outlet 53 of the conduit 51 and connected to the outlet. Preferably, the outlet connection element 91 is formed of one piece with the conduit 51. The outlet connection element 91 is hollow and has an opening at the outlet 53 of the conduit to allow ejection of the coffee grounds from the conduit through the connection element.

In the illustrated embodiment, without limitation, the outlet connection element 91 extends outside the conduit 51, in a main direction perpendicular to the longitudinal axis of the dispensing conduit 51. A first connecting flange 90, which projects out of the main plane of extension of the structure 55, is attached to the structure or is integral with the structure. The first connecting flange 90 is configured to support the outlet connection element 91, and be attached thereto by first fastener means 89 (e.g. a plurality of screws into a fastening box). Accordingly, the conduit 51 is supported by the load transfer structure 55 through the outlet connection element 91, the first fastener means 89 and the first connecting flange 90.

It shall be understood that other methods of connection, namely fixation, may be provided between the dispensing conduit 51 and the load transfer structure 55, other than those as shown in the figures. Particularly, the outlet connection element 91 is optional, and the connection flange 90 is also optional.

In the embodiments of FIGS. 1-4, the plate 54 is attached to the load transfer structure 55 by means of a pivot or pin 88 for pivoting about the axis AA, which moves the plate 54 from the closed position to the open position.

Figure 5:
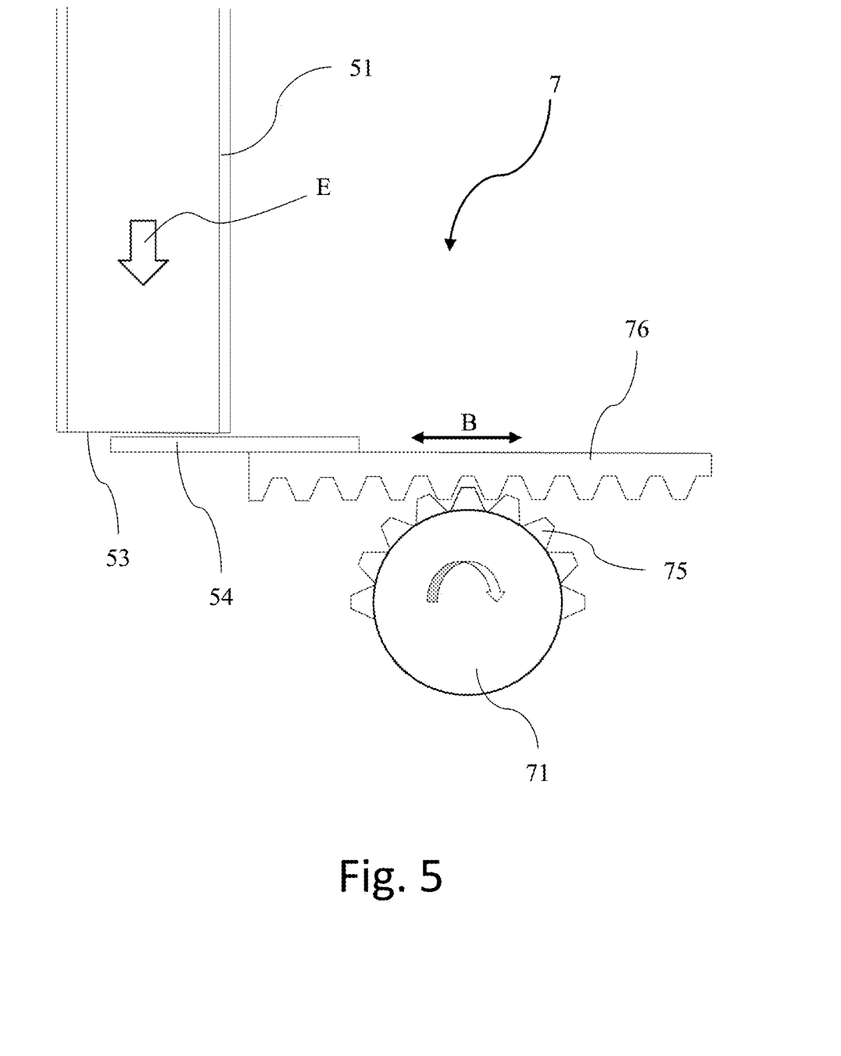

In an alternative embodiment, a detail whereof is schematically shown in FIG. 5, described in further detail hereinbelow, the closure member 54 is movable relative to the load transfer structure 55 in the straight direction.

The load transfer structure 55 is attached to the first end portion 61 of the load cell 6. Particularly, the first end portion, 61 of the cell 6 comprises a supporting surface 64 for application of bending stresses.

In the illustrated example, the load transfer structure 55 is attached to such bearing surface 64 by means of second fastener elements 65, e.g. screws. Particularly, the connection portion 92 of the structure 55 is attached to the first end portion 61 of the cell 6. Thus, the load transfer structure 55 is supported in hanging relation on the support surface of the load cell 6 and in turn, the conduit 51 and the closure member 54 are constrained to the load transfer structure 55, and are hence supported by the load cell 6 in hanging relation through the structure 55.

As mentioned above, the second end portion 62 of the load cell 6 can be fixed to a support structure for supporting the load cell 6, which supports the main body 5 in hanging relation by its free first end portion. As more clearly explained hereinbelow, the support structure does not hang from the load cell 6. Preferably, the support structure rests on or is attached to a base.

Figure 2:
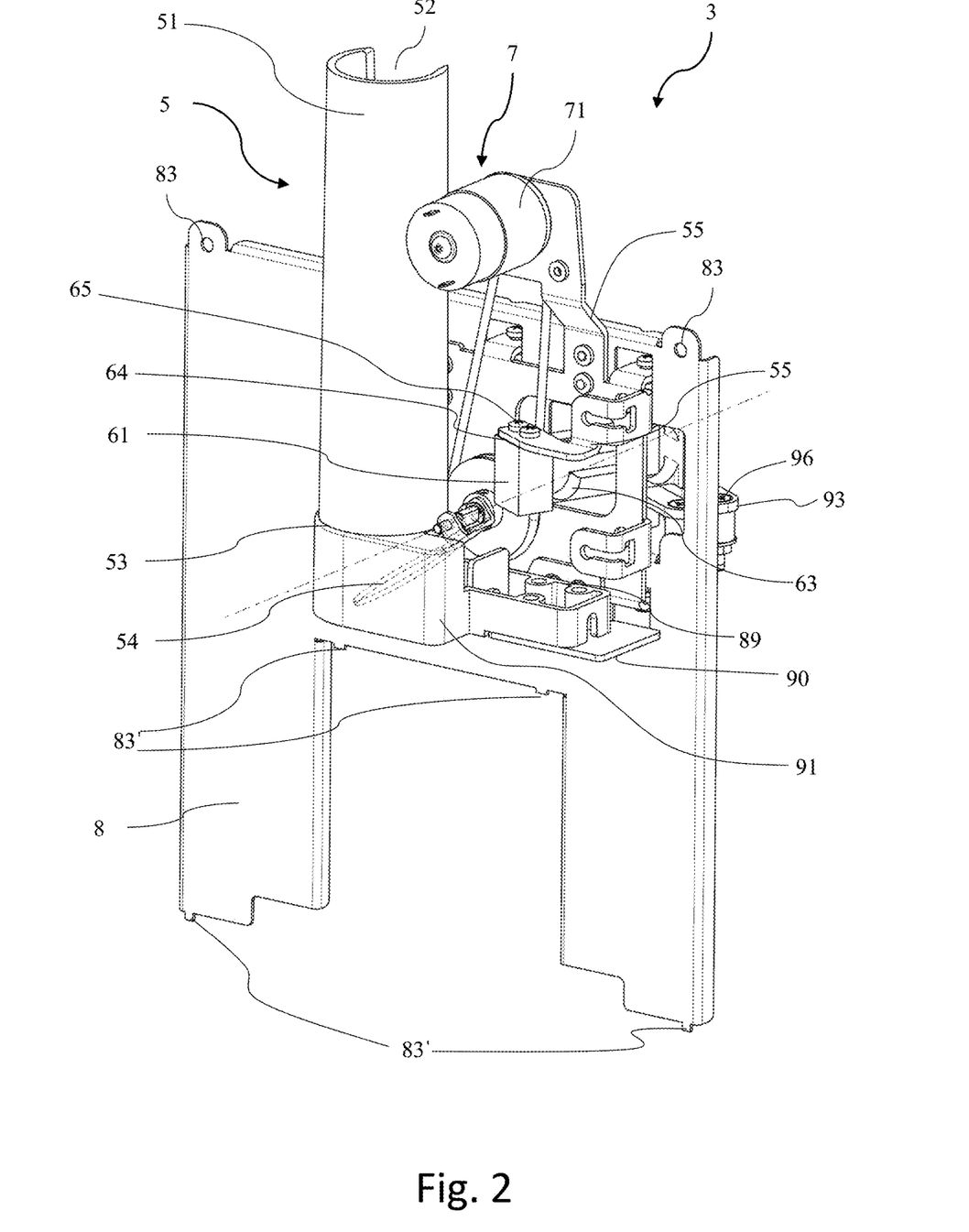
FIG. 2 shows a perspective view of the dosing device of FIG. 1, which comprises a support frame according to a further embodiment of the present invention.
Figure 3:
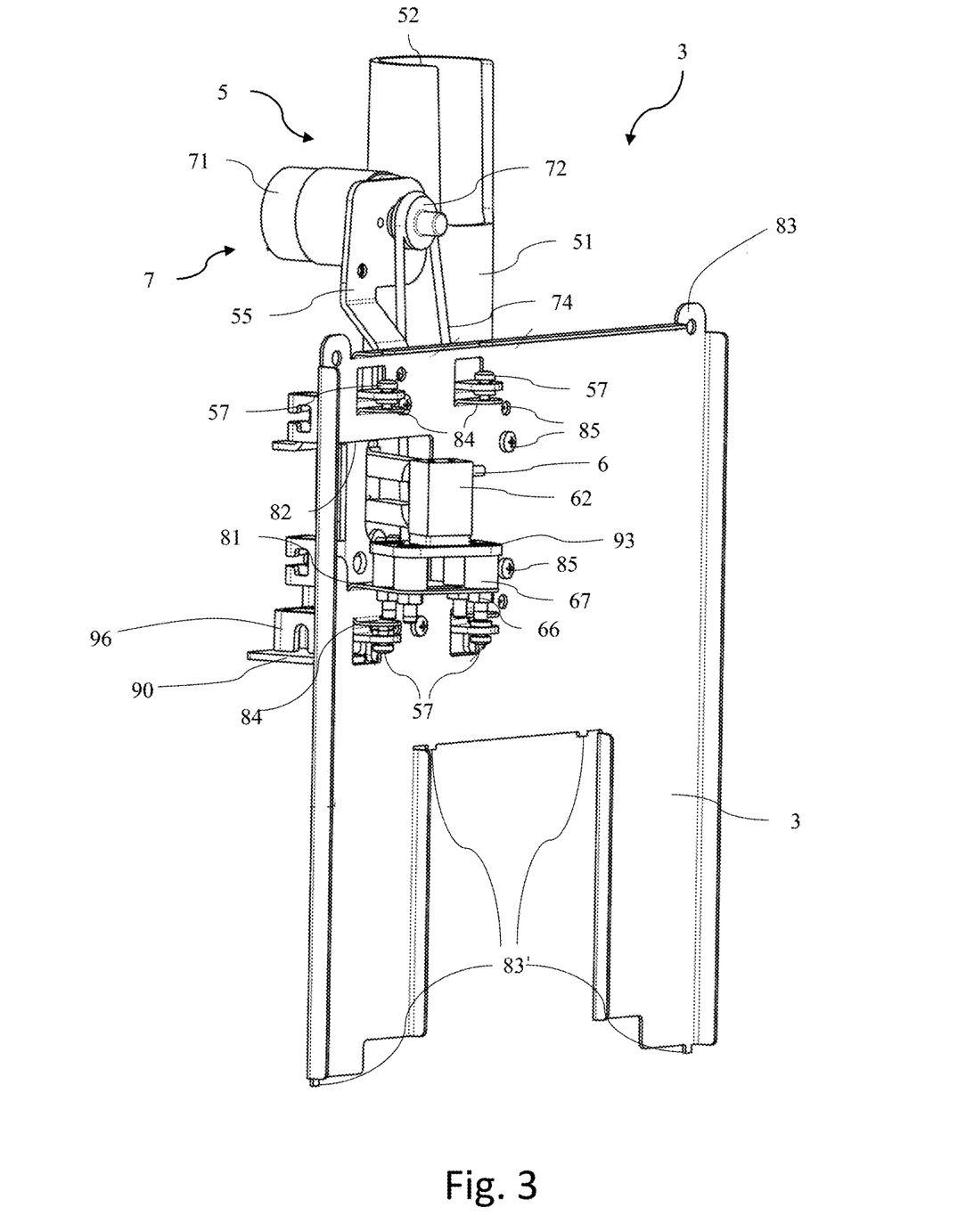
FIG. 3 is a rear perspective view of the dosing device of FIG. 2.
Figure 4:
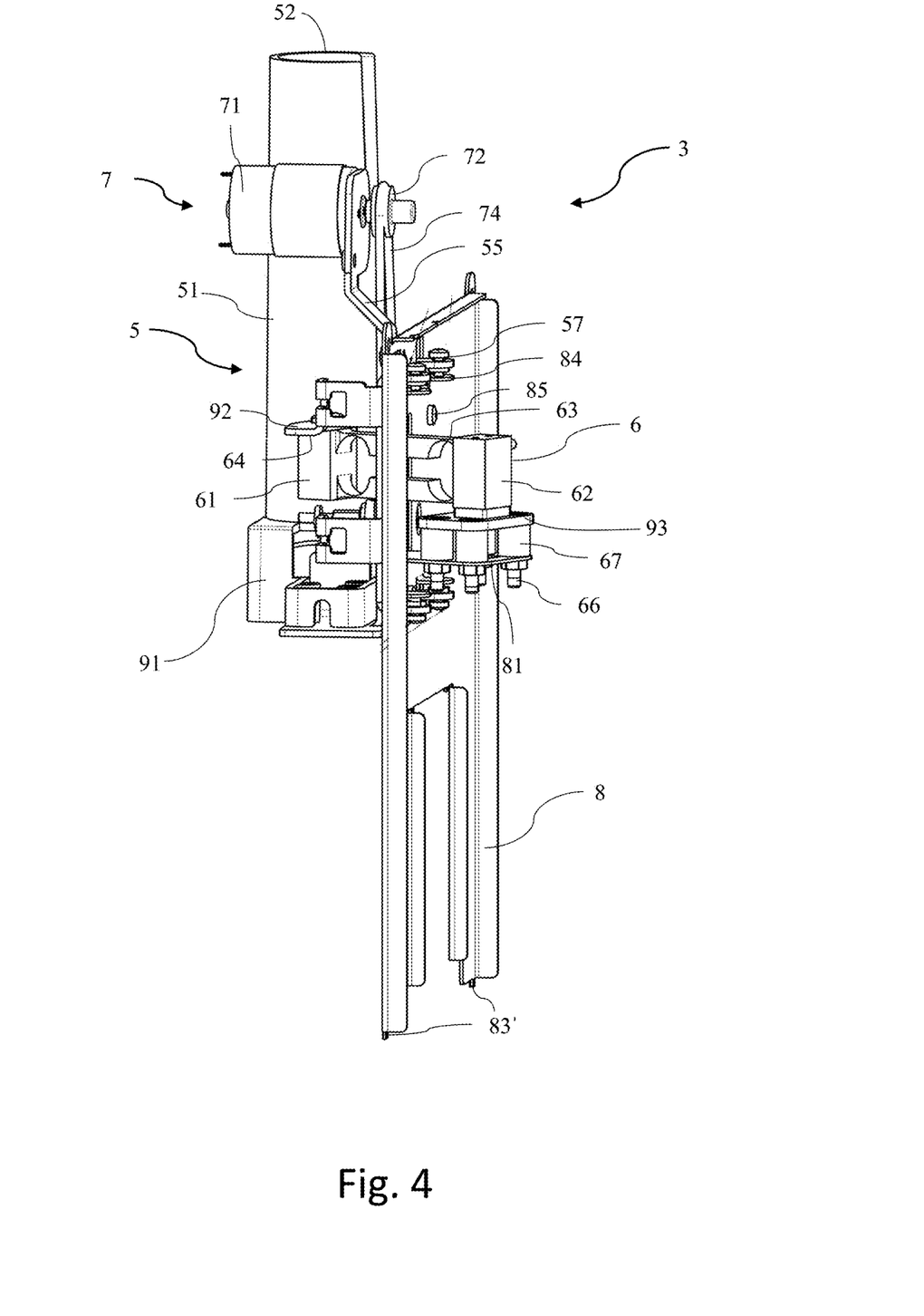
FIG. 4 is a side perspective view of the dosing device of FIG. 2, FIG. 5 schematically shows a detail of a dosing device according to one embodiment of the present invention.

Referring to the embodiment of FIGS. 2-4, the support structure, which is external to the main body, is a panel 8 that is supported or fixed to a base, in the work position of the dosing device, to thereby support the main body. Preferably the panel 8 is formed as a suitably shaped plate. The second end portion 62 of the load cell 6 is attached to the panel 8 of the dosing device 3. The panel 8 is preferably a substantially flat panel, which is located behind the load transfer structure 55, and with a vertical orientation, for the main body 5 to be arranged to project out of the panel 8. In the illustrated embodiments, the main body 5 comprises at least one portion projecting out of the panel 8, such portion comprising at least the conduit 51 and the closure member 54.

The panel 8 of the dosing device 3 may be stably supported or be mechanically connected to a frame (not shown in FIGS. 1-5) of a grinding-dosing machine, which comprises the dosing device 3. The second end 62 of the load cell 6 may be connected to the frame either indirectly through the panel 8 of the dosing device 3 (like in the example as shown in the figures) or directly. The panel 8 supports the load transfer structure 55. Since the panel 8 rests on a base and/or is attached to a frame, it is not weighed by the load cell 6.

Preferably, the load cell 6 is arranged to project out of the panel 8. The panel 8 has an opening 82, at the opening 77 of the load transfer structure 55, for the passage of the load cell 6 through the openings, with the load cell 6 not contacting the edge of the opening 82, to avoid measurement errors.

The panel 8 is attached to the load transfer structure 55 and hence to the main body 5 by the second end portion 62 of the load cell 6. Since no other constraint points are provided between the load cell and a structure external to the main body, the load transfer structure is supported in hanging relation on the flexible and free first end portion 61 of the load cell and is free to move relative to the panel 8.

Preferably, the movement of the load transfer structure and hence the main body is vertically restricted by first limit-stop elements, and more preferably is also horizontally restricted by second limit-stop elements. The first limit-stop elements, and the second limit-stop elements, if any, are configured to restrict the movement of the main body 5 and the panel 8 relative to each other, to thereby protect the load cell 6 from excessive deformations as a result of accidental damage to the main body 5.

In the embodiment as shown in the figures, first limit-stop elements comprise limit-stop screws 57 and respective abutment surfaces 84. The screws 57 of the first limit-stop elements are arranged in such a manner as to be spaced from the abutment surfaces 84 when no impact occurs, and to contact their respective abutment surfaces 84 in the case of impacts, to thereby restrict the movement of the main body 5 and the panel 8 relative to each other. Namely, the limit-stop screws 57 are fixed to the upper portion and the lower portion of the load transfer structure 55, and particularly to respective flanges formed in the structure 55 at respective holes in the panel 8. For example, the abutment surfaces 84 horizontally project out of the panel 8. Each screw 57 of the main body 5 has an abutment surface 84 of the panel 8 corresponding thereto, to allow the main body 5 to move relative to the panel in the vertical direction, before stopping its movement.

Preferably, the movement of the main body is restricted in the horizontal direction by second limit-stop elements, for instance limit-stop screws 85 attached to the panel 8, proximate to the vertical walls of the load transfer structure. Each screw 85 of the panel 8 has an abutment surface of the main body 5 corresponding thereto, for instance a vertical portion of the load transfer structure 55.

It shall be appreciated that, by defining the load transfer structure that holds the main body (open conduit) as the tare, the movement caused by (further) bending of the free end portion of the load cell for weighing the coffee grounds is relatively small, considering typical coffee grounds masses dispensed into a portafilter ranging from 5 to 30 grams.

In the exemplary implementation as shown in the figures, the second end portion 62 of the load cell 6 is attached to the back surface of the panel 8, opposite to the front surface on which the load transfer structure 55 is arranged to project (as shown in FIGS. 3 and 4). The panel comprises a connection flange 81, projecting out of the main plane of extension of the panel 8, which can be made by cutting and bending a portion of the panel 8. The second end portion 62 of the load cell 6 rests on, and is preferably fastened to a plate 93 that rests on the connection flange 81, disposed below and parallel to the plate 93 and spaced from the latter through the use of damping elements 67. The ends of these damping elements are fastened to the plate 93 and the flange 81, by means of screws 96 and nuts 66 respectively.

It shall be understood that other ways of fastening the second end portion 62 of the load cell 6 are possible. For example the second end portion may be fixed to a flange, which is in turn fixed to the back surface of the panel (not shown). The damping elements 67 are optional and the provision of both a plate and a flange for attaching the second end 62 of the load cell to the panel is also optional.

As discussed in greater detail below, in certain embodiments, the panel 8 is preferably configured for connection with a support structure that is external to the dosing device. For this purpose and according to the example of FIGS. 2-4, the panel has connection elements 83 and 83'.

Preferably, the main body 5 comprises a drive system 7 which is configured to move the closure member 54 between the open position and the closed position. The drive system 7 is connected to the load transfer structure 55. It will be appreciated that the mass as measured by the load cell 6 is also inclusive of the mass of the drive system 7. Preferably, the drive system 7 comprises a motor 71 connected to the plate 54.

In the embodiment as shown in FIGS. 1 to 4, the drive system 7 comprises a first pulley 72 driven by the motor 71, a second pulley 73 which is fixed to the pivot 88 and pivots relative thereto, to thereby rotate the closure member 54, and a drive belt 74 for transferring the rotary motion from the first pulley 72 to the second pulley 73, i.e. from the motor 71 to the closure member 54, to thereby move the closure member 54 between the open position and the closed position.

In a further embodiment, as schematically shown in FIG. 5, the drive system 7 comprises a cogwheel 75 coupled to a motor 71, and a rack 76. The rack 76 cooperates with the cogwheel 75 to convert the rotary motion of the toothed wheel into a rectilinear motion, such that the motor 71 will move the closure member 54, for instance a plate, between the open position and the closed position in the direction B, in both ways. The direction of movement of the plate is horizontal, i.e. perpendicular to the main extent of the dispensing conduit 51. The arrow E indicates the direction of discharge of coffee grounds along the dispensing conduit.

The dosing device of the present disclosure is included in a grinding-dosing machine, which comprises a coffee bean grinding device.

Preferably, the grinding-dosing machine comprises an electronic control unit (not shown in FIGS. 1-6) connected to the load cell 6 and to the drive system 7. The control unit is configured to actuate the drive system 7, and in particular the motor 71, to thereby move the closure member 54 from the open position to the closed position and vice versa.

Figure 6:
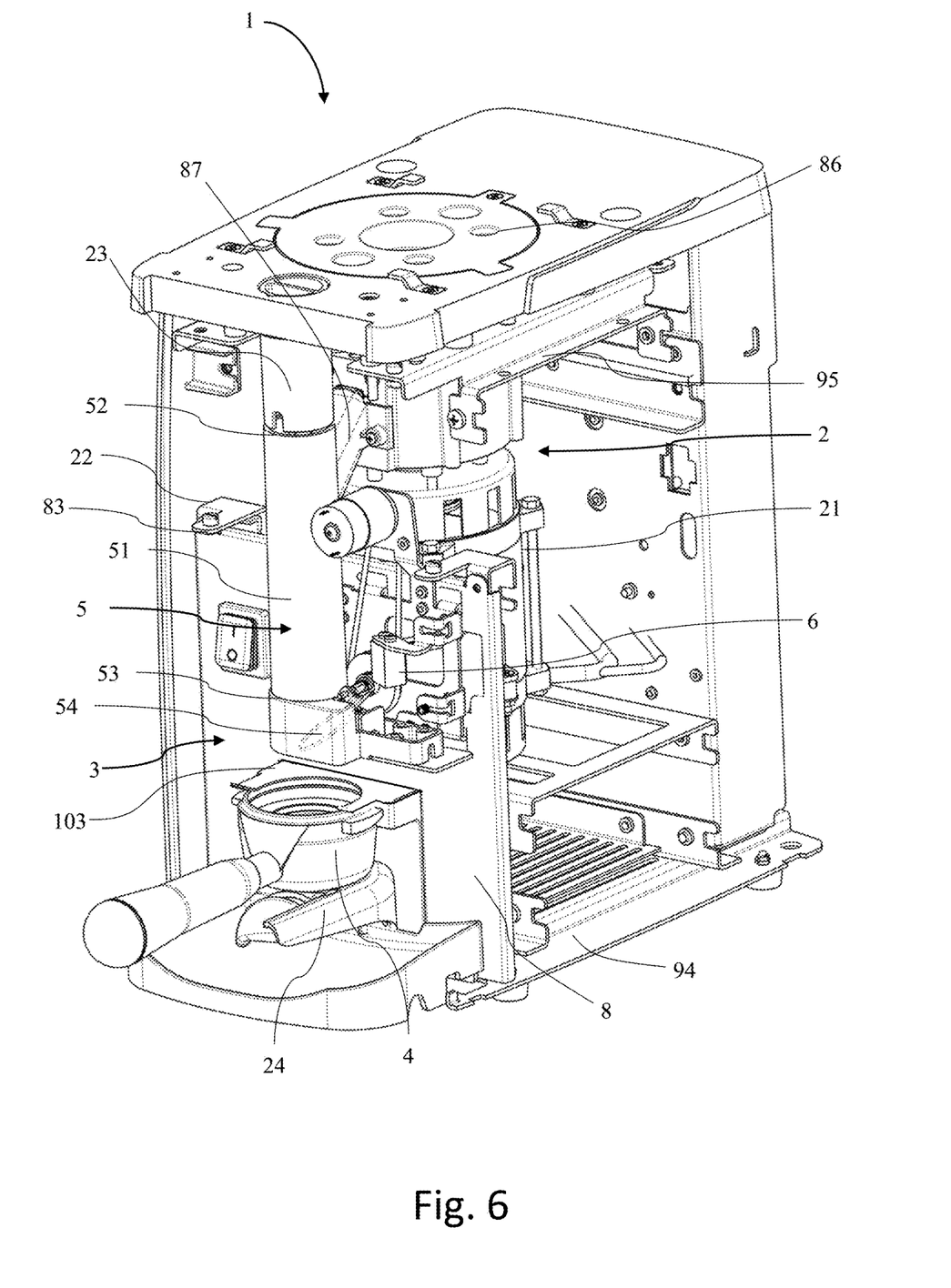
FIG. 6 is a perspective view of a grinding-dosing machine according to a preferred embodiment of the present invention.

FIG. 6 is a perspective view of a coffee grinding-dosing machine, according to one embodiment. The grinding-dosing machine 1 comprises a coffee bean grinding device, or grinding device 2 and a dosing device, and particularly the dosing device 3 according to the embodiment as shown in FIGS. 2-4. The same reference numerals indicate the same elements or elements having the same function. It shall be understood that the machine may comprise a dosing device according to a different embodiment of the present disclosure.

The grinding device 2 has known characteristics, some of which are described in any case, for better understanding of the operation of the dosing device 3.

The grinding-dosing machine comprises a vessel (not shown in FIG. 6), for instance formed as a hopper, in which coffee beans can be deposited for later grinding, and which can be coupled to a coupling member 86. The grinding device is in communication with the vessel to receive the deposited coffee beans therefrom. The grinding device comprises a grinder unit (not shown) which is designed to be driven by a motor 21. Conventionally, the grinder unit comprises one or more grinding wheels (e.g. A pair of flat or cylindrical grinding wheels) or one or more relatively rotating blades for grinding coffee beans.

The grinding-dosing machine 1 comprises a frame 95 that supports the bean-containing vessel and the grinding device 2. The frame 95 comprises a base 94 upon which the machine lies. The coffee grounds are ejected from the grinder unit which is connected with the inlet 52 of the dispensing conduit 51 of the dosing device 3. Particularly, the grinder unit introduces coffee grounds into a connecting duct, e.g. a chute 87, connected to the conduit 51.

An optional conduit 23 connects the conduit 51 to the upper surface of the grinder-doser 1 to afford cleaning thereof without disassembling the machine.

The machine 1 further comprises a retaining support 24, which is configured to support and/or mechanically connect a portafilter 4. For example, the retaining support is a fork, on which the portafilter is laid. Preferably, the outlet 53 of the conduit 51 faces the retaining support 24 to allow coffee grounds to be discharged into the portafilter that rests on or is connected to it, when the closure member 54 is in the open position. The dosing device 3 is placed on the portafilter retaining support 24.

The panel 8 is mounted in the housing of the machine 1 and is mechanically connected to a support structure of the machine 1, which is external to the dosing device. In FIG. 6, the panel 8 is attached to a portion 22 of the frame 95 of the machine by means of connecting elements 83. In the embodiment of the figures, the panel 8 comprises additional connecting elements, e.g. coupling teeth 83', as shown in FIGS. 2 and 4, for the panel 8 to be coupled to the base 94 of the grinding-dosing machine 1 and preferably, to an optional sealing flange 103 of the portafilter 4.

In another embodiment, the panel 8 is only attached to the base 94 of the frame of the machine 1.

It shall be understood that the load transfer structure 55 may be supported and/or mechanically connected to a panel 8 having a configuration other than that shown in the figures or, as mentioned above, be supported and/or directly connected to a fixed structure external to the dosing device 3, such as a frame of a machine that houses the dosing device. In the latter case, the panel 8 will not be necessarily provided.

In one embodiment (not shown), the second end portion 62 is directly attached to a portion of frame 95 of the grinding-dosing machine.

It shall be noted that, since the portafilter 4 is not designed to rest on any part of the main body 5 or the load cell 6, the dosing device 3 may be configured in such a manner that the mass of the main body 5 will remain substantially constant throughout the useful life of the dosing device 3 or at least for an extended use of the device.

Figure 7:
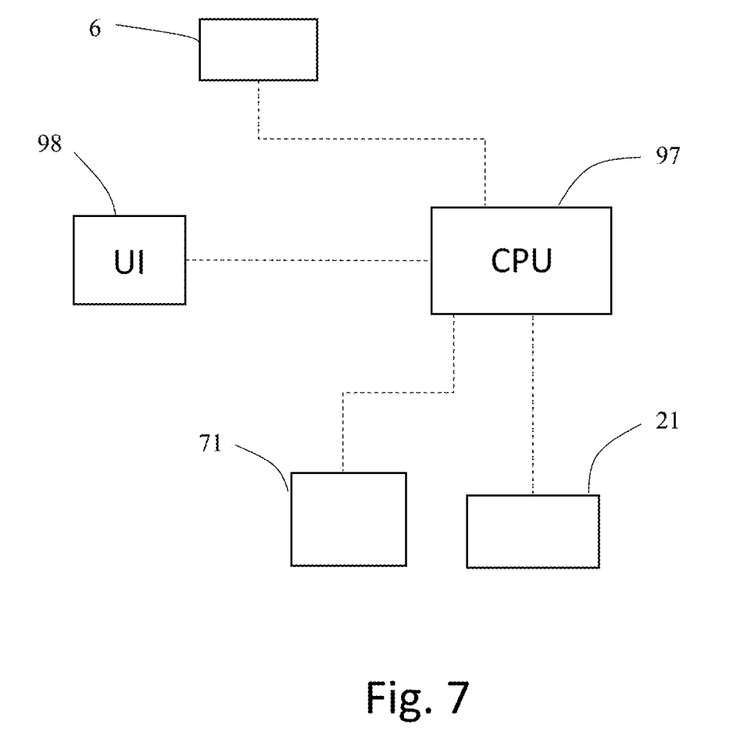
FIG. 7 is a block diagram of a system for controlling grinding and weighing of the coffee grounds with reference to the grinding-dosing machine of FIG. 6.

FIG. 7 is a block diagram of a system for controlling grinding and weighing of the coffee grounds. The machine is equipped with an electronic control unit, e.g. a central processing unit, CPU 97, and a user interface 98 which is electronically connected to the control unit. Conventionally, the user interface may be a touch-screen display or a keypad through which the user can input commands and/or enter input data. The control unit, which is usually housed in the machine and the user interface, typically arranged on an outer front panel of the machine for easy access by a user, are not shown in FIG. 6. The motor 21 of the grinder unit and the motor 71 which moves the closure member 54, as schematically shown in FIG. 7, are controlled by the CPU 97. The CPU is configured to receive electric measurement signals representative of the weight by the weight sensor 6 and to transmit control signals to the weight sensor, to the motor of the grinder unit 21 and to the motor 71 for driving the closure member 54. The control signal lines from/to the CPU 97 are shown in FIG. 7 by a dashed line.

In one embodiment, the control unit controls the operation of the grinder unit of the grinding device 2, through the grinder motor 21. Namely, the control unit is configured to start a grinding operation and stop a grinding operation when the weight of the coffee grounds attains a default value or when a default time interval expires. The default time and/or weight values may be either selected by the user or stored in the control unit. The default values, hereinafter also referred to as nominal values can be entered as input data that are received by the CPU or stored in the CPU. The nominal weight and/or time values may vary according to the desired coffee recipe.

Figure 8:
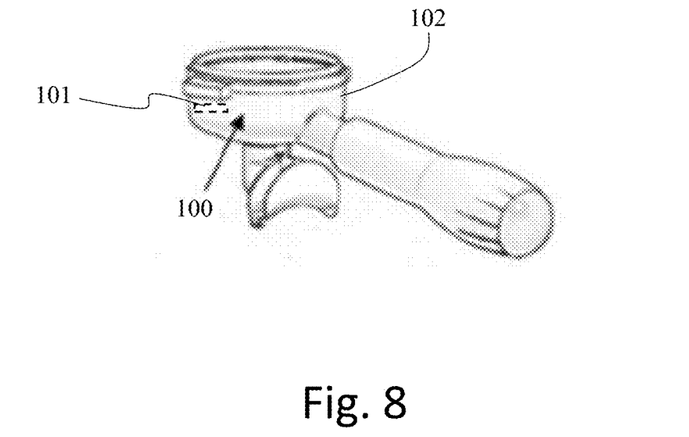
FIG. 8 is a schematic view of an example of a portafilter.

The grinding-dosing machine may be equipped with means, known per se, for recognizing a portafilter, and the control unit is configured to associate different default coffee weight values with different portafilters. FIG. 8 shows an exemplary portafilter 100, which may have an identifier 101 (schematically shown), which is preferably removable, and is preferably placed on the basket 102 for recognition by a sensor. While the identifier is shown in a lateral region of the basket of the portafilter, the identifier can be placed on the front of the basket 102 (not shown in FIG. 8). The identifier 101 may be an optical identifier, such as a color or any other prior art means, such as a barcode, an inductive means or a mechanical code with which the recognition sensor interacts. Referring to FIG. 6, when the filter holder 100 is placed on the fork 24, a presence sensor (not shown), e.g. of inductive type, detects the presence of the portafilter. The presence sensor is configured to generate an electric presence signal and is connected with the CPU. A recognition sensor (not shown), e.g. placed below the sealing flange 103, at the identifier of the portafilter, detects coffee grounds dispensing type, e.g. total mass to be dispensed and, optionally, the degree of grinding. The recognition sensor is configured to generate an electric portafilter recognition signal. As the presence of the portafilter is detected, the presence sensor transmits an electric presence detection signal to the control unit. The CPU is configured to receive the portafilter identification signal in addition to the presence detection signal and, as upon reception of these signals, to control a grinding operation according to the dispensing type associated with the identifier. Conventionally, the electronic control unit stores a data table that contains a plurality of identifier data associated with a respective plurality of portafilter identifiers, with each data identifier being associated with a nominal dose of coffee grounds.

Preferably, before using the grinding-dosing machine, e.g. during the installation of the machine, an operator calibrates the dosing device for the load cell to read a zero weight value when no coffee grounds are present in the dispensing conduit. Preferably, the operator sets a nominal coffee grounds weight value.

In one embodiment, the operator enters a nominal weight value as an input data into the user interface 98 and starts a grinding operation for an initial configuration of the machine. The CPU is configured to receive the nominal weight value entered by the user and, once the grinding operation has been selected, to carry out the operation with the plate in the closed position and to check the weight of coffee grounds on the plate, as the operation is being carried out. When the weight of the coffee that falls on the plate attains the nominal weight value that has been previously set, the grinding operation is stopped and the control unit is configured to determine the grinding time associated with the nominal weight value and to store this value as a nominal grinding time value. The nominal weight value and the associated nominal grinding time value are stored in the CPU. The CPU is preferably configured for calculating, based on these values, a nominal mass throughput of coffee grounds, e.g. in grams per second.

The CPU is preferably configured to store a plurality of nominal weights of coffee grounds associated with a corresponding plurality of nominal grinding times, for example depending on the type of beverage to be prepared. According to the nominal weight values stored, the control unit may be configured to determine a respective plurality of mass throughputs or grinding times. If a plurality of types of beverages are provided, the control unit is preferably configured to create an input data table, listing nominal weight values and associated nominal mass throughput (or nominal grinding time) values, for each type of beverage, as acquired as a result of respective calibration operations.

The selection of the type of beverage and hence the selection of the nominal weight, time and possibly mass throughput, may be made manually or through automatic recognition of the portafilter, as described above.

After the initial configuration of the machine, and according to one embodiment of the machine, the latter works "on demand" and the dosing device operates with the coffee grounds dispensing conduit always open, namely the control unit is configured to hold the plate in the open position. In this mode, the dispensed dose is a function of the grinding time stored in the machine for a particular type of beverage.

The Applicant found that during use of the grinding-dosing machine in a dispensing mode that relies on the grinding time, the operating conditions may change over time of use of the machine, which will allow the dispensed dose to no longer correspond to the desired dose set by a user or stored in the machine.

Preferably, the weight of coffee grounds being dispensed is controlled automatically. In an "on demand" mode of use of the grinding-dosing machine, such control may be actuated after a given time of use of the machine (e.g. after a few hours, one day or one week). The weight of the dispensed dose may be controlled in a single dispensing operation or, in a preferred embodiment, over a plurality of dispensing operations.

In one embodiment, the electronic control unit is configured to: (a) setting the closed position of the plate; (b) receiving input data indicative of the type of beverage (e.g. single espresso, double espresso, American coffee), said input data being associated with a nominal coffee grounds weight value, $W_N$, and with a first grinding time value, $t_1$, that have been stored and, preferably, calculating a nominal mass throughput, $Q_n=W_n/t_1$; (c) controlling a grinding operation having a duration equal to the first grinding time value, $t_1$; (d) measuring an actual coffee grounds weight value, $W_r$, at the end of the grinding operation; (e) comparing the actual weight value $W_r$ with the nominal weight value $W_n$; (f) based on the result of the comparison, if the value $W_r$ differs from $W_n$ above a predetermined threshold value, determining a value of the actual mass throughput, $Q_r=W_r/t_1$, based on the actual weight value and the first grinding time value, and (g) setting the grinding time to a second grinding time value, $t_2$, to obtain the nominal value of the dose of coffee grounds, $W_n$. The second grinding time value is calculated based on the value of the actual mass throughput, $T_2=W_n/Q_r$.

The second grinding time value, $t_2$, is stored in the control unit in place of the first grinding time value.

The first grinding time value, $t_1$, may correspond to the nominal time value that has been set in the machine upon calibration.

The electronic control unit may be configured to record the actual weight value $W_r$ before comparing this value with the nominal weight value $W_n$.

The steps (a) and (b) may be exchanged in order.

The step (d) is carried out by receiving an electric measurement signal generated by the weight sensor, and representative of the actual weight value.

Preferably, the control unit is configured to control the opening movement of the plate, after the step (d). It shall be understood that the plate may be moved to the open position after one of the steps following the step (d).

Preferably, the control unit is configured to control a new grinding operation for a the grinding time equal to the second grinding time, $t_2$, once the conduit has been opened.

The mode of operation of the grinding-dosing machine as described above with reference to steps (a) to (g) may be used to check calibration of the machine and/or proper operation of the grinding-dosing machine. The operator can start the automatic procedure comprising the steps (a) to (g) by selecting a command in the user interface. With no request being made by the user, the plate 54 is kept open, and the coffee is ground for a default stored time, which may selected according to the beverage type. Upon request by the user, the plate 54 closes for a single grinding operation, allowing the weight of the coffee grounds to be measured and a new grinding time to be stored. Once the operator has checked that the correct mass has been dispensed in one dose, he/she may switch the grinding-dosing machine back to the "on demand" operation, with the closure member 54 always open during grinding and preferably between successive grinding operations.

In the above described mode of operation, the "correct" grinding time is calculated based on a previous grinding operation. For example, if the nominal mass throughput value $Q_n$ is 2 g/s and the nominal weight value $W_n$ is 10 grams of coffee, the nominal grinding time initially set in the control unit is $t_n=t_1=5$ seconds. If, after a grinding operation, the measured weight value is $W_r=7$ grams (other than the nominal weight), the mass throughput, for the nominal time of 5 seconds, is $Q_r=1.4$ g/s. In order to obtain the nominal weight of 10 g, the grinding time will be adjusted to a value $t_2=7$ seconds, which accounts for the mass throughput change.

Preferably, the stored time is changed if the measured weight of the coffee grounds differs from the value of the nominal weight by at least a default threshold value of 10%, more preferably of 7%.

According to a further embodiment, the weight of the coffee grounds is measured after a plurality N of dispensing operations of doses associated with the same dispensing/drink type. In this embodiment, the grinding-dosing machine is configured to open and close the closure member at each dispensing operation for the plurality of dispensing operations associated with the same dispensing type. The control unit is configured to store a nominal weight value, $W_N$, and a nominal grinding time value, $t_n$, and to determine a nominal mass throughput value, $Q_n=W_n/t_n$. The control unit is configured to: i) move the closure member to the closed position, ii) carry out a grinding operation having a duration equal to the nominal grinding time $t_n$ such that the coffee grounds will deposit on the closure member; (iii) receive a measurement signal representative of the actual weight value of coffee grounds built up on the closure member at the end of the grinding operation and record the actual value of the measured weight, $W_R$, and (iv) move the closure member to the open position to discharge the coffee grounds.

The control unit is configured to carry out the operating steps (i) to (iv) for N grinding operations, to thereby record, for each operation, an actual measured weight value, $W_R$.

Then, at the end of a plurality N of grinding operations and storage of a respective plurality of actual weight values ($W_R$), with i=1, . . . , N, the electronic control unit is configured to calculate a respective plurality of values of mass throughput ($Q_r$), based on the actual measured weight values and the nominal grinding time, $t_n$, and to calculate the average mass throughput value $\overline{Q}$ of the plurality of values of the mass throughput and the average actual dose value, $\overline{W}_r$. Preferably, N ranges from 2 to 10, e.g. 5.

If the average weight $\overline{W}_r$ deviates from the nominal weight value $W_n$ is above a predetermined threshold value, the control unit is configured to adjust the grinding time to a grinding time value that has been determined by the ratio of the nominal weight, $W_N$ to the average mass throughput value $\overline{Q}$. Preferably, the predetermined threshold value for deviation between the nominal weight and the average actual value is 10%, more preferably 7%.

Since one or more of the operating conditions of the machine might change during the time of use thereof, the above discussed procedure can provide a new grinding time value that more closely corresponds to the desired dose of coffee grounds. Said determined grinding time is stored in the control unit for later coffee grounds dispensing operations.

The mode of operation of the grinding-dosing machine as described above with the dispensed dose being weighed for a plurality of N grinding operations, may be used to check calibration of the machine and/or proper operation of the grinding-dosing machine. The operator may start the automatic procedure by selecting a control in the user interface. In certain embodiments, with no request being made by the user, the plate 54 is kept open, and the coffee is ground for a default stored time, which may selected according to the beverage type. Upon request by the user, the plate 54 closes and opens for a plurality N of grinding operations for a beverage type, and a new grinding time for that beverage type is later stored. Once the operator has checked that the correct average mass has been dispensed in a plurality of doses, he/she may switch the grinding-dosing machine back to the "on demand" operation, with the closure member 54 always open during grinding and preferably between successive grinding operations.

Since the N dispensing operations from which the average weight value has to be calculated and the actual average mass throughput are associated with a given type of beverage and hence with a given nominal dose value, such plurality of dispensing operations may not be successive. For example, two types of dispensing operations are provided, i.e. dose A (e.g. single espresso) and dose B (e.g. double espresso or two single espressos). Depending on requirements, the grinding-dosing machine, which has been set in weight control mode, is controlled to successively dispense 3 doses A of coffee, 4 doses B of coffee and 2 doses A. If the number N of dispensing operations for the dose A, designed for average weight control has been set to 5, at the end of the last dispensing operation for the dose A, the control unit carries out the above described averaging procedure and stores the actual grinding time value, if any, as a new nominal grinding time value.

In the above described mode of operation, the "correct" grinding time is calculated based on N previous grinding operations.

In a conventional grinding-dosing machine, the coffee powder is collected in a container. This filling operation may be carried out automatically or manually and the coffee grounds content typically ranges from 100 to 200 grams. While the use of such grinding-dosing machine provides the advantage of allowing the portafilter to be filled with coffee powder in a relatively short time, the permanence of the coffee grounds in the collection container, for a relatively long time and in the presence of air and moisture, can cause a degradation of the organoleptic characteristics of coffee.

The Applicant found that, while an "on demand" grinding-dosing machine does not involve coffee grounds build-up, instant grinding of coffee causes the dispensing time for a dose of coffee grounds to be longer than the time required for the ejection of coffee grounds from a collection container. By way of illustration and example, the preparation of a dose for a single espresso takes approximately 2 seconds in an "on demand" machine, whereas 0.5 seconds are required for ejection of coffee grounds from a collection container in a conventional grinder-doser. In case of peak demands of coffee in a bar or restaurant, the coffee grounds dispensing times in an "on demand" machine might cause delays in beverage preparation.

The Applicant realized that if the grinding-dosing machine is configured to have a buffer dose available when a grinding operation is requested, then the times required for obtaining the doses of coffee grounds for beverage preparation can be shortened.

In a further mode of operation of the machine, the electronic control unit is configured to maintain the closure member of the dispensing conduit always in the closed position and to control opening thereof only upon dispensing of coffee powder into the portafilter. Upon the ejection of coffee grounds from the conduit, the control unit instructs closing of the dispensing conduit and grinding of a buffer dose of coffee that builds up in the dispensing conduit.

The coffee grounds dispensing conduit always contains a specific amount of coffee powder, i.e. the buffer dose, which may have been determined by the operator during calibration. For example, the buffer dose is the minimum dose for preparing a beverage of the plurality of beverages, e.g. a single dose for an espresso.

Once a dose of coffee has been ejected the control unit 97 is configured to carry out a grinding operation to obtain a buffer dose in the conduit 51.

Preferably, the grinding-dosing machine comprises a presence sensor configured to detect the presence of the portafilter 4 on the fork 24 and removal thereof from the fork once dispensing has been completed. After removal of the portafilter 4, the control unit 97 starts a grinding operation to obtain a new buffer dose in the conduit 51.

The buffer dose in the conduit may be restored after a given time, i.e. the grinding operation has a predetermined duration, which is equal to a first grinding time stored in the control unit, or based on weight control during dispensing.

In case of buffer dose dispensing with weight control, during the grinding operation for build-up of a buffer dose, the electronic control unit is configured to: continuously receive signals representative of the weight of coffee grounds built up on the closure member while coffee grounds are discharged through the conduit, continuously comparing the coffee grounds weight values associated with the received signals, with the buffer weight value and stopping the grinding device when a measured weight value is equal to the buffer weight value.

When the user selects a beverage via the user interface 98 or when the recognition sensor, if an identifier is present in the portafilter, detects the coffee grounds dispensing type, the electronic unit 97 checks whether the dispensing type corresponds to the buffer dose that is already present on the closure member 54. If it does, the control unit instructs the closure member 54 to open and the coffee powder is moved into the portafilter. If it does not, the control unit actuates the grinding device and carries out a second grinding operation for a time that can provide the nominal dose value that has been selected by the user.

If the dose required to prepare a selected beverage is a multiple of the buffer dose, e.g. if the buffer dose corresponds to a single dose and the filter of the portafilter to be filled corresponds to a double dose, a new dispensing operation has to be carried out to dispense coffee into the dispensing conduit 51. Here, the time required to obtain a double dose is reduced to about one half, which improves effectiveness of coffee grounds production for beverage preparation.

In one embodiment, when the central electronic unit detects the presence of the portafilter by receiving a signal from the presence sensor, the unit actuates the user interface. In the user interface 98, the user selects the button that corresponds to the desired dose by actuating the grinding operation via the control unit, i.e. by actuating the grinder unit. If the machine also comprises a recognition sensor, the electronic unit will actuate the motor 21 of the grinder unit according to the dose associated with the identifier. During the grinding operation, the plate 54 is kept in the closed position. The grinding operation continues until the load cell senses the weight associated with the selected dose. At the end of the grinding operation, the central unit instructs the plate to open for discharging the dose into the portafilter, and then to close, and starts a grinding operation for dispensing a buffer dose that builds up again on the plate, waiting for a new request for dispensing of a coffee dose.

Another embodiment does not include weight sensing during the grinding operation for dispensing a given dose, but includes a grinding operation for a predetermined grinding time. Such predetermined time is calculated as a difference between the dispensing time associated with the desired dose and the dispensing time associated with the buffer dose.

In one embodiment, the control unit is configured to control the weight of the buffer dose by receiving a weight signal from the load cell as the buffer dose has been completely dispensed on the plate. Thus, the buffer dose is monitored to avoid undesired deviations.

Certain embodiments provide adjustment of the grinding time as required to obtain a buffer dose if the latter deviates from a nominal value beyond a predetermined threshold value.

Preferably, a method is provided of controlling the buffer dose of coffee, which comprises: receiving a measurement signal representative of an actual weight value of coffee grounds built up on the closure member, the signal being generated at the end of the grinding operation, for dispensing a buffer dose having a buffer weight value; comparing the measured actual weight value with the stored buffer weight value and, based on the result of the comparison, if the measured actual weight value differs from the buffer weight value to an extent exceeding a predetermined threshold value, calculating a mass throughput value based on the actual weight value and the first grinding time; calculating a grinding time value based on the calculated mass throughput value to obtain the buffer coffee grounds dose value, and storing the calculated grinding time value as the new grinding time value associated with the buffer weight value.

It shall be understood that a person skilled in the art can make many changes equivalent to the described embodiments without departing from the scope of the accompanying claims.

The invention claimed is:

1. A method of controlling dispensing of coffee grounds from a grinding-dosing machine, the machine comprising a grinding device which is configured to grind coffee beans, a dispensing conduit, having an inlet in communication with the grinding device for receiving coffee grounds, and an outlet, a closure member which is adapted to be removed between an open position for the coffee grounds to be discharged from the dispensing conduit through the outlet, and a closed position for closing the outlet, and a coffee grounds weight sensor, which is configured to generate signals representative of a weight of the coffee grounds built-up in the dispensing conduit onto the closure member when the closure member is in the closed position, the method comprising:
   a) storing a nominal weight value of the coffee grounds;
   b) storing a nominal grinding time value associated with the nominal weight value;
   c) placing the closure member in the closed position;
   d) operating the grinding device for discharging the coffee grounds through the dispensing conduit onto the closure member for a time equal to the nominal grinding time value, in a first grinding operation;
   e) at the end of the first grinding operation, receiving a measurement signal representative of an actual weight value of the coffee grounds built-up in the dispensing conduit onto the closure member;
   f) comparing the actual weight value with the stored nominal weight value and, based on the result of the comparison, if the measured actual weight value differs from the nominal weight value to an extent exceeding a predetermined threshold value, calculating a mass throughput based on the actual weight value and the nominal grinding time value;
   g) based on the calculated mass throughput value, calculating an actual grinding time value to obtain the nominal value of the coffee grounds dose; and
   h) storing the actual grinding time value as a new nominal grinding time value.

2. The method of claim 1 which comprises, after the step a) and before the step d), receiving input data requesting coffee grounds dispensing, associated with the nominal weight value of the coffee grounds, wherein the step d) of operating the grinding device is carried out in response to the reception of said input data.

3. The method of claim 1, which further comprises:
   after the step e), placing the closure member in the open position; and
   after the step h), and after said step of placing the closure member in the open position:
      receiving input data requesting the coffee grounds dispensing, associated with the nominal weight value of coffee grounds; and
      in response to the reception of said input data, operating the grinding device for a time equal to the nominal grinding time, in a second grinding operation, while maintaining the closure member in the open position to discharge the coffee grounds from the dispensing conduit during the second grinding operation.

4. The method of claim 1, which further comprises, after the step a) and before the step b):
   operating the grinding device for discharging the coffee grounds through the dispensing conduit onto the closure member;
   continuously receiving measurement signals representative of the weight of the coffee grounds built up [[on]] onto the closure member during discharge of the coffee grounds through the dispensing conduit;
   continuously comparing the weight values of the coffee grounds, associated with the received measurement signals, with the nominal weight value of the coffee grounds;
   stopping the grinding device as soon as a weight value measured by the sensor is equal to the nominal weight value; and
   determining a nominal grinding time value equal to the duration of the completed grinding operation,
   wherein the step b) comprises storing said nominal grinding time value.

5. The method of claim 4 which further comprises, between the step b) and the step c): placing the closure member in the open position, for the coffee grounds to be discharged.

6. The method of claim 1, wherein the grinding-dosing machine further comprises a retaining support which is configured to support or mechanically connect a portafilter, wherein the outlet of the dispensing conduit is placed above and faces the retaining support, for the coffee grounds to be discharged into the portafilter when the closure member is in the open position.

7. The method of claim 1, wherein the weight sensor is a load cell and the dispensing conduit and the closure member are connected to the load cell to be supported on the load cell in hanging relation.

8. The method of claim 7, wherein the load cell is configured to indicate a zero weight if no coffee grounds are contained in the dispensing conduit.

9. A method of controlling dispensing of coffee grounds from a grinding-dosing machine, the machine comprising a grinding device which is configured to grind coffee beans, a dispensing conduit, having an inlet in communication with the grinding device for receiving coffee grounds, and an outlet, a closure member which is adapted to be removed between an open position for the coffee grounds to be discharged from the dispensing conduit through the outlet, and a closed position for closing the outlet, and a coffee grounds weight sensor, which is configured to generate signals representative of a weight of the coffee grounds built-up in the dispensing conduit onto the closure member when the closure member is in the closed position, the method comprising:

a) storing a nominal weight value of the coffee grounds;
b) storing a nominal grinding time value associated with the nominal weight value;
c) placing the closure member in the closed position;
d) operating the grinding device for discharging the coffee grounds through the dispensing conduit onto the closure member for a time equal to the nominal grinding time value, in a first grinding operation;
e) at the end of the first grinding operation, receiving a measurement signal representative of an actual weight value of the coffee grounds built-up in the dispensing conduit onto the closure member;
f) placing the closure member in the open position to discharge the coffee grounds weighed at the end of the first grinding operation from the dispensing conduit;
g) repeating the steps c) to e) (N−1) times, with N≥2, to receive N actual weight values at the end of N respective grinding operations and placing the closure member in the open position at the end of each of the (N−1) grinding operations following the first grinding operation;
h) calculating a respective mass throughput value based on each of the N actual weight values and the nominal grinding time value, to obtain N mass throughput values;
i) calculating an average mass throughput value from the N mass throughput values and an average weight value from the N actual weight values;
j) comparing the average weight value with the stored nominal weight value and, if the average weight value differs from the nominal weight value to an extent exceeding a predetermined threshold value, calculating an average grinding time value, defined as a ratio of the nominal weight value to the calculated average mass throughput value; and
k) storing the average grinding time value as a new nominal grinding time value.

* * * * *